United States Patent [19]

Miller et al.

[11] Patent Number: 4,463,557
[45] Date of Patent: Aug. 7, 1984

[54] OPEN CENTER HYDRAULIC SYSTEM

[75] Inventors: James A. Miller, Cedar Falls; Derek M. Eagles, Hudson, both of Iowa

[73] Assignee: Deere & Company, Moline, Ill.

[21] Appl. No.: 522,920

[22] Filed: Aug. 12, 1983

[51] Int. Cl.³ .......................... F16D 31/00; B62D 5/08
[52] U.S. Cl. .......................................... 60/422; 60/384; 60/427; 91/518; 137/596.13; 180/132
[58] Field of Search ................. 60/422, 384, 385, 387, 60/420, 427; 91/514, 516, 517, 518; 180/132; 137/596, 596.13

[56] References Cited

U.S. PATENT DOCUMENTS

| | | | |
|---|---|---|---|
| 2,892,311 | 6/1959 | Van Gerpen | 60/52 |
| 2,892,312 | 6/1959 | Allen et al. | 60/52 |
| 3,750,405 | 8/1973 | Lech et al. | 60/422 |
| 4,034,563 | 7/1977 | Orth | 60/422 |
| 4,044,786 | 8/1977 | Yip | 137/101 |
| 4,116,001 | 9/1978 | Orth | 60/420 |
| 4,292,805 | 10/1981 | Acheson | 60/450 |
| 4,293,284 | 10/1981 | Carlson | 417/218 |
| 4,337,620 | 7/1982 | Johnson | 60/422 |
| 4,343,151 | 8/1982 | Lorimor | 91/516 |
| 4,345,614 | 8/1982 | Karlberg et al. | 60/384 |

Primary Examiner—Robert E. Garrett
Assistant Examiner—H. Edward Li

[57] ABSTRACT

An open center hydraulic system is disclosed which contains a primary work circuit and a secondary work circuit. A fixed displacement pump is fluidly connected between a reservoir and the primary and secondary work circuits for supplying pressurized fluid thereto. The primary work circuit includes a control valve which regulates fluid flow from the pump to a primary hydraulic function and which includes a feedback mechanism connected thereto. The secondary work circuit also includes a manually operable control valve for regulating fluid flow from the pump to a secondary hydraulic function. A priority valve is connected between the pump and the secondary work circuit and is movable between an open and a closed position to regulate the pressure of fluid discharged by the pump. Pressurized fluid from the primary work circuit is conveyed through a load signal line to the priority valve such that the pressurized fluid will urge the priority valve towards the closed position thereby assuring that adequate fluid pressure is available from the pump to the primary work circuit. The system also includes a control valve for sensing pressure variations between the fluid discharged from the pump and fluid present in the load signal line. This valve controls fluid flow out of the primary hydraulic function, via the load signal line, when the pressure of the fluid discharged by the pump is less than the pressure of the fluid in the load signal line and thereby essentially eliminates kickback from the primary control valve.

12 Claims, 1 Drawing Figure

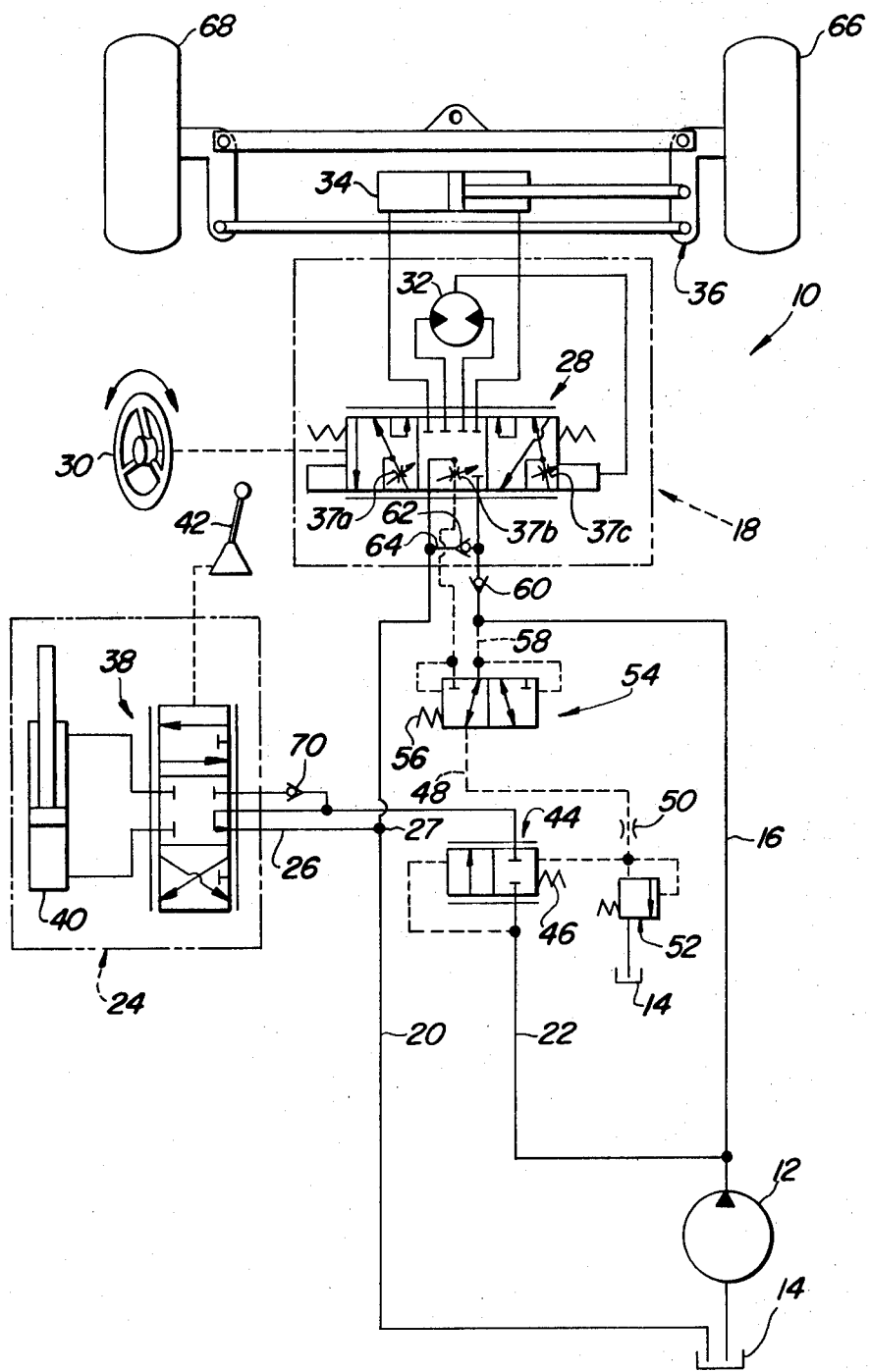

OPEN CENTER HYDRAULIC SYSTEM

FIELD OF THE INVENTION

This invention relates to an open center hydraulic system and more particularly, to an open center system with a load sensing priority function which eliminates kickback from a feedback mechanism contained in a control valve which is fluidly connected to a hydraulic function.

BACKGROUND OF THE INVENTION

Currently, some agricultural and industrial equipment manufacturers design and construct vehicles which utilize open center hydraulic systems with a priority function such as steering. Such systems can experience a kickback problem in the steering control valve as pressure fluctuations occur within the system. Such kickbacks can become very annoying to the operator during operation of the vehicle. Most open center systems do not alleviate the kickback problem and those that attempt to do so have proven to be very complicated in construction and costly to produce. Now an open center hydraulic system has been invented which will essentially eliminate kickback on the steering wheel.

SUMMARY OF THE INVENTION

Briefly, this invention relates to an open center hydraulic system which assures that a primary work circuit has priority in flow demand over a secondary work circuit. The system includes a fixed displacement pump fluidly connected between a reservoir and a control valve of the primary work circuit. A priority valve is connected between the pump and the secondary work circuit and is movable between an open and a closed position to control fluid flow therethrough. As the priority valve closes, a restriction occurs which causes the pressure from the pump to increase so as to supply fluid at a greater pressure to the primary control valve. A load signal line is connected between the primary control valve and the priority valve for transmitting pressure signals thereto and which urges the priority valve toward the closed position. The system further includes a valve for sensing pressure variation between fluid discharged by the pump and fluid present in the load signal line. The valve also controls fluid flow out of the primary work circuit, via the load signal line, when the pressure of the fluid discharged by the pump is less than the pressure of the fluid in the load signal line and this essentially eliminates kickback from the primary control valve.

The general object of this invention is to provide an open center hydraulic system which assures that a primary work circuit has priority in flow demand over a secondary work circuit. A more specific object of this invention is to provide an open center hydraulic system which eliminates kickback from a feedback mechanism contained in a manually operable control valve fluidly connected to a primary hydraulic function.

Another object of this invention is to provide a simple and economical open center hydraulic system.

Still further, an object of this invention is to provide an open center hydraulic system wherein kickback is eliminated from the steering wheel of a vehicle.

Other objects and advantages of the present invention will become more apparent to those skilled in the art in view of the following description and the accompanying drawings.

BRIEF DESCRIPTION OF THE DRAWING

The FIGURE is a schematic diagram of an open center hydraulic system.

DETAILED DESCRIPTION OF THE PREFERRED EMBODIMENT

Referring to the FIGURE, an open center hydraulic system 10 is shown which controls the steering of a vehicle, for example, an agricultural or industrial tractor. The system 10 includes a fixed displacement pump 12 which is fluidly connected to a reservoir 14. The pump 12 supplies pressurized fluid through a first supply line 16 to a primary work circuit 18. The primary work circuit 18 is in turn connected to the reservoir 14 by a return line 20. The pump 12 is also connected by a second supply line 22 to a secondary work circuit 24 which is in turn connected by a return line 26 at point 27 to the return line 20 and, hence, to the reservoir 14.

The open center hydraulic system 10 is designed such that the primary work circuit 18 has priority over the secondary work circuit 24. Although as depicted, the primary work circuit 18 is a steering circuit, other hydraulic circuits could be utilized as the primary circuit. As shown, the primary work circuit 18 includes a steering valve 28 which is movably actuated by a manually operable steering wheel 30 and by a fluidly activated gerotor 32. The fluid output of the steering valve 28 is directed to the ends of a hydraulic cylinder 34 so as to control the movement of a steering linkage 36. The physical construction and connection of the steering valve 28 to the gerotor 32 and to the hydraulic cylinder 34 are all well-known to those skilled in the art. It should be noted, however, that the steering valve 28 is shown as being a three-position valve having three distinct orifices 37a, b, and c, for metering fluid flow therethrough.

The secondary work circuit 24 also contains a hydraulic valve 38 which is fluidly connected to the ends of a hydraulic cylinder 40. The hydraulic cylinder 40 can be used in numerous applications, for example, the raising or lowering of an implement which is attached to the vehicle. Preferably, the hydraulic valve 38 is mechanically activated by a lever mechanism 42.

A priority valve 44 is positioned across the second supply line 22 and is movable between an open and a closed position to control fluid pressure to the primary work circuit 18, when needed, by restricting the flow of fluid from the pump 12 to the secondary work circuit 24. Preferably, the priority valve 44 is biased by a spring 46 toward a closed position, wherein fluid flow through the second supply line 22 will be restricted or blocked. The priority valve 44 is movable by the fluid pressure in the second supply line 22 to an open position wherein fluid is allowed to flow with little if any restriction to the secondary work circuit 24.

The open center hydraulic system 10 also includes a load signal line 48 fluidly connected between the primary work circuit 18 and the priority valve 44. The load signal line 48 is capable of transmitting pressure signals, which are generated by loads acting on the hydraulic cylinder 34, to the priority valve 44. As can be seen in the FIGURE, the load signal line 48 directs fluid to the right-hand end of the priority valve 44 and cooperates with the spring 46 to urge the priority valve 44 toward its closed position. As the fluid pressure builds within the load signal line 48, the priority valve 44 will be moved leftwards toward its closed position and a restriction will form in the second supply line 22. This restriction will cause the pressure within the second supply line 22 and in the first supply line 16 to increase since the pump 12 is discharging fluid at a constant flow rate. Therefore, it should be understood that the pressurized fluid in the load signal line 48, along with the spring 46, cooperates with the pump 12 to restrict fluid flow to the secondary work circuit 24 and thereby regulate fluid pressure to the primary work circuit 18. This assures that adequate fluid flow and pressure is available from the pump 12 to the primary work circuit 18.

An orifice 50 is positioned across the load signal line 48 to meter flow therethrough and a relief valve 52 is arranged downstream of the orifice 50 and in a parallel relationship to the priority valve 44. The relief valve 52 is spring-biased to a closed position and is fluid activated by the pressure in the load signal line 48, downstream of the orifice 50, so as to open and relieve pressurized fluid in that part of the load signal line 48 when the pressure exceeds a predetermined value. The excess fluid is returned to the reservoir 14 so that it can be used again.

In such a priority load steering system, when a combination of a reverse pressure difference across and a reverse flow through the gerotor 32 occurs, a torque develops which causes the steering valve 28 to rotate in a direction opposite to the direction in which the operator has turned the steering wheel 30. This opposite rotation of the steering valve 28 causes a kickback of the steering wheel 30 and this is undesirable. The present open center hydraulic system 10 eliminates this kickback by using a load signal control valve 54 which is located across the load signal line 48 between the primary work circuit 18 and the orifice 50. The load signal control valve 54 is preferably a three-way, two-position valve which is biased both by a spring 56 and by fluid pressure in the load signal line 48 to a first position (as shown) wherein the first supply line 16 is fluidly connected by a line 58 to the load signal line 48. The control valve 54 is movable leftward to a second position by fluid pressure, in both the first supply line 16 and in the line 58, which acts on the right end of the valve 54. In the second position, the steering valve 28 is fluidly connected by the load signal line 48 to the priority valve 44.

The load signal control valve 54 is capable of sensing pressure variations between the fluid in the first supply line 16 and the fluid in the load signal line 48. The valve 54 is movable in response to such pressure variations and will prevent fluid flow out of the primary work circuit 18, via the load signal line 48, when the fluid pressure in the first supply line 16 is less than the fluid pressure in the load signal line 48. By preventing this fluid flow out of the steering valve 28, one eliminates the fluid flow path for reverse fluid flow through the gerotor 32 and thereby eliminates an opposite force from acting on the steering valve 28 which would cause the steering wheel 30 to kickback.

The open center hydraulic system 10 further includes a one-way check valve 60 positioned in the first supply line 16 between the point where the control valve 54 is connected to the first supply line 16 and the point where the first supply line 16 is connected to the steering valve 28. This check valve 60 prevents the reverse flow of fluid out of the primary work circuit 18 through the first supply line 16. A second one-way check valve 62 is positioned in a line 64 which connects the return line 20 to the first supply line 16. The check valve 62 permits fluid flow from the return line 20 to the first supply line 16 should the operator's input to the steering wheel 30 be greater than the fluid flow available from the pump 12. When this occurs, flow normally routed back to the reservoir 14 is used to fill the first supply line 16 and thereby prevents the first supply line 16 from cavitating.

The open center hydraulic system 10 also includes right and left wheels 66 and 68 which are mounted on the linkage 36. Also, a lift check valve 70 is associated with the secondary work circuit 24 and prevents the reverse flow of fluid out of the secondary control valve 38.

OPERATION

The operation of the open center hydraulic system 10 will now be explained using various pressure values which are assigned to triggering the movement of certain valves in order to acquaint the reader with the system. It should be understood that the invention is not limited to these hypothetical values.

Starting from a condition wherein the engine of the vehicle is not running, the pump 12 will not be operating. At this time, the steering valve 28 will be in its neutral position, the hydraulic cylinder 34 is depressurized, the priority valve 44 will be closed and the control valve 54 will be in its first position, all of which are indicated in the FIGURE. As soon as the operator starts the engine, the pump 12 will supply pressurized fluid through the first supply line 16 toward the steering valve 28 and through the second supply line 22 toward the priority valve 44. Since the steering valve 28 is in its neutral position, fluid flow through the steering valve 28 will be blocked and the fluid pressure will rise within the first supply line 16. As the pressure rises and reaches about 50 psi, which represents the force needed to compress the spring 56, the control valve 54 will shift leftwards to a second position. In the second position, the control valve 54 blocks the flow of pressurized fluid from the first supply line 16 to the load signal line 48 and permits the fluid in the load signal line 48 to be connected to the reservoir 14 via the orifice 37b and the return line 20. When the pressure discharged from the pump 12 reaches about 150 psi, it will overcome the spring 46 acting on the right-hand end of the priority valve 44 and cause the priority valve 44 to move rightward towards its open position. With the priority valve 44 in its open position, fluid is routed to the control valve 38 of the secondary work circuit 24. Since the control valve 38 is in its neutral position, as shown, the fluid will not be able to pass through the control valve 38 but instead is routed back to the reservoir 14 via return lines 26 and 20. The open center hydraulic system 10 is now in a standby condition.

NORMAL STEER OPERATION

The open center hydraulic system 10 will function as follows when fluid is required by the primary work circuit 18 while the hydraulic valve 38 of the secondary work circuit 24 is in its neutral position. Starting from the standby position wherein the control valve 54 is in its second position and the priority valve 44 has moved towards the open position, fluid flow from the pump 12 will be directed through the first and second supply lines 16 and 22, respectively, towards the primary and secondary work circuits 18 and 24. At this time, the operator may initiate a right turn by turning the steering wheel 30 rightwards. By turning the steering wheel 30 rightwards, the steering valve 28 is moved rightward such that the first supply line 16 is fluidly connected through the orifice 37a to the left-hand side of the gerotor 32. The right-hand side of the gerotor 32 is fluidly connected to the rod end of the hydraulic cylinder 34 and the head end of the hydraulic cylinder 34 is fluidly connected by the return line 20 to the reservoir 14.

If we assume that the pressure needed to move the piston within the hydraulic cylinder 34 is 900 psi, then the pressure from the pump 12 would have to increase from the 150 psi standby pressure to the 900 psi value before the wheels 66 and 68 will begin to turn. With the pressure at only 150 psi, the piston within the hydraulic cylinder 34 will not be movable by the fluid pressure and therefore the fluid would flow past the orifice 37a via the load signal line 48 to the left-hand end of the control valve 54. This fluid pressure, together with the force of the spring 56, will urge the control valve 54 to its first position, as shown. With the control valve 54 in its first position, the fluid in the first supply line 16 will be connected by the load signal line 48 to the priority valve 44. The pressure of the fluid in the load signal line 48, together with the force of the spring 46, will cause the priority valve 44 to move leftwards towards its closed position and restrict fluid flow therethrough. This restriction will then cause the pressure in the first and second supply lines 16 and 22, respectively, to increase.

When the pressure in the first supply line 16 reaches approximately 900 psi, fluid will begin to flow through the steering valve 28 to the rod end of the hydraulic cylinder 34. The 900 psi pressure value will also be sensed in the load signal line 48 and this increase in pressure will cause the priority valve 44 to close further. Once the pressure in the supply lines 16 and 22 reach a value of about 950 psi, a 50 psi pressure drop will be developed across the orifice 37a. It takes 50 psi to compress the spring 56, so the control valve 54 will start to shift to the second position. The pressure in the supply line 16 and 22 will continue to increase to say about 1050 psi, which is equal to 900 psi coming from the steering load via the load signal line 48 to the right side of the priority valve 44 plus the 150 psi which represents the force of the spring 46. As long as the operator continues to turn the steering wheel 30 rightwards, the above condition will be maintained.

Once the operator stops turning the steering wheel 30, the primary control valve 28 will move to its neutral position and the fluid in the load signal line 48 will drain back through the orifice 37b and the return line 20 to the reservoir 14. When this happens, the pressure in the load signal line 48 will drop to essentially zero. As the pressure in the load signal line 48 decreases, the priority valve 44 will move rightwards towards its open position due to the pressure in the second supply line 22. As the priority valve 44 opens, the restriction thereacross is reduced and the system 10 returns to its standby condition wherein full flow is routed to the secondary hydraulic valve 38 and then back to the reservoir 14 via return lines 26 and 20.

STEERING AGAINST A FORCE ACTING ON THE WHEELS

Should a situation arise where an external force is acting on at least one of the wheels, for example when one of the wheels is in a rut and has an external force acting on it such as to force it to the left, and the operator tries to turn the steering wheel 30 to the right, the hydraulic system 10 would function in the following way. Starting from the standby position, the steering valve 28 will move to the right such that the orifice 37a is aligned with the first supply line 16 and the pressurized fluid therein will be fluidly connected through the gerotor 32 to the rod end of the hydraulic cylinder 34. At the same time, the head end of the hydraulic cylinder 34 will be fluidly connected to the reservoir 14 via the return line 20. Pressurized fluid in the rod end of the hydraulic cylinder 34, which incidentally will be higher than the pressure in the first supply line 16, will feed back through the gerotor 32 and through the load signal line 48 to the left-hand end of the control valve 54. This pressurized fluid, which is at a higher pressure than the fluid in the first supply line 16, will cause the control valve 54 to move rightwards towards its first position, as shown. With the control valve 54 in its first position, reverse flow of fluid out of the rod end of the hydraulic cylinder 34 and through the gerotor 32 is prevented. By eliminating the reverse flow of fluid through the gerotor 32, kickback at the steering wheel 30 is eliminated.

Once the control valve 54 has moved to its first position, the hydraulic system 10 will operate as described above in the section entitled "Normal Steer Operation".

While the invention has been described in conjunction with a specific embodiment, it is to be understood that many alternatives, modifications, and variations will be apparent to those skilled in the art in light of the aforegoing description. Accordingly, this invention is intended to embrace all such alternatives, modifications, and variations which fall within the spirit and scope of the appended claims.

We claim:

1. A load sensing hydraulic system comprising:
   (a) a reservoir capable of holding a quantity of fluid;
   (b) a pump fluidly connected to said reservoir;
   (c) a control valve having a feedback mechanism connected thereto, said control valve regulating fluid flow from said pump to a hydraulic function;
   (d) a priority valve connected downstream of said pump and being movable between an open and a closed position to regulate the pressure of the fluid discharged by said pump;
   (e) a load signal line connecting said control valve to said priority valve for conveying pressurized fluid thereto, said pressurized fluid urging said priority valve toward said closed position which assures that said pump will increase the pressure of discharged fluid and provide adequate fluid to said control valve; and
   (f) means for sensing pressure variations between fluid discharged from said pump and fluid present in said load signal line and for preventing fluid flow out of said hydraulic function via said load signal line when the pressure of said fluid discharged by said pump is less than the pressure of said fluid in said load signal line thereby essentially eliminating kickback from said control valve.

2. The load sensing hydraulic system of claim 1 wherein said means is a three-way, two-position valve.

3. An open center hydraulic system comprising:
   (a) a reservoir capable of holding a quantity of fluid;
   (b) a fixed displacement pump fluidly connected to said reservoir;
   (c) a primary work circuit fluidly connected to said pump, said primary work circuit including a primary control valve with a feedback mechanism connected thereto, said control valve regulating fluid flow from said pump to a primary hydraulic function;

(d) a secondary work circuit fluidly connected to said pump, said secondary work circuit including a manually operable secondary control valve for regulating fluid flow from said pump to a secondary hydraulic function;

(e) a priority valve connected between said pump and said secondary work circuit and movable between an open and a closed position to regulate the pressure of the fluid discharged by said pump;

(f) a load signal line connecting said primary control valve to said priority valve for conveying pressurized fluid thereto which urges said priority valve toward said closed position thereby assuring that adequate fluid pressure is available from said pump to said primary work circuit; and (g) means for sensing pressure variations between fluid discharged from said pump and fluid present in said load signal line and for preventing fluid flow out of said primary hydraulic function via said load signal line when the pressure of said fluid discharged by said pump is less than the pressure of said fluid in said load signal line thereby essentially eliminating kickback from said primary control valve.

4. The open center hydraulic system of claim 3 wherein said means is a three-way, two-position valve.

5. The open center hydraulic system of claim 4 wherein said three-way, two-position valve is spring-biased toward a first position in which said pump is fluidly connected to said priority valve via said load signal line and is biased to fluid pressure discharged from said pump to a second position in which said primary control valve is fluidly connected to said priority valve via said load signal line.

6. The open center hydraulic system of claim 3 wherein said priority valve is a two-way, two-position valve which is spring biased toward said closed position.

7. An open center hydraulic system which assures that a primary work circuit has priority in flow demand over a secondary work circuit and which essentially eliminates kickback from a primary control valve with a feedback mechanism contained in said primary work circuit, said system comprising:

(a) a reservoir capable of holding a quantity of fluid;
(b) a fixed displacement pump fluidly connected to said reservoir;
(c) first and second fluid conduits connecting said pump to said primary control valve and said primary control valve to said reservoir, respectively;

(d) third and fourth fluid conduits connecting said pump to a secondary control valve contained in said secondary work circuit and connecting said secondary control valve to said reservoir, respectively;

(e) a priority valve connected across said third conduit and being movable between an open and a closed position to regulate the pressure of the fluid discharged by said pump;

(f) a load signal line connecting said primary work circuit to said priority valve for conveying pressurized fluid thereto which urges said priority valve toward said closed position thereby assuring that adequate fluid pressure is available from said pump to said primary work circuit;

(g) an orifice positioned across said load signal line for metering fluid flow therethrough;

(h) a relief valve positioned downstream of said orifice and in parallel with said priority valve, said relief valve being set to relieve fluid pressure above a predetermined value downstream of said orifice; and (i) valve means for sensing pressure variations between fluid in said first conduit and fluid in said load signal line and being movable relative to such pressure variations to prevent fluid flow out of said primary work circuit via said load signal line when fluid pressure present in said first conduit is less than fluid pressure present in said load signal line.

8. The open center hydraulic system of claim 7 wherein said valve means is a three-way, two-position load signal control valve.

9. The open center hydraulic system of claim 8 wherein said load signal control valve is spring biased toward a first position in which said pump is fluidly connected to said priority valve via said load signal line and said load signal control valve is biased by fluid pressure within said first conduit toward a second position in which said priority valve is fluidly connected via said load signal line and said return line to said reservoir.

10. The open center hydraulic system of claim 7 wherein said priority valve is a two-way, two-position valve which is biased toward said closed position.

11. The open center hydraulic system of claim 9 wherein said priority valve is biased toward said closed position by both a fluid force and a spring force.

12. The open center hydraulic system of claim 7 wherein a one-way check valve is positioned across said first conduit between the point where said valve means is connected to said first conduit and the point where said first conduit is connected to said primary work circuit for preventing reverse flow of fluid out of said primary work circuit.

* * * * *

UNITED STATES PATENT AND TRADEMARK OFFICE
CERTIFICATE OF CORRECTION

PATENT NO. : 4,463,557

DATED : 7 August 1984

INVENTOR(S) : James A. Miller and Derek M. Eagles

It is certified that error appears in the above-identified patent and that said Letters Patent is hereby corrected as shown below:

Column 7, line 35, delete "to" and insert -- by --.

Signed and Sealed this

Twenty-sixth Day of February 1985

[SEAL]

Attest:

DONALD J. QUIGG

Attesting Officer

Acting Commissioner of Patents and Trademarks